US000001049H

United States Statutory Invention Registration [19]

[11] Reg. Number: H1049

Khadduri et al.

[43] Published: May 5, 1992

[54] GAS GENERATION FOR A MISSILE POST-BOOST CONTROL SYSTEM

[76] Inventors: Farid M. Khadduri, 5526 Westbard Ave., Bethesda, Md. 20816; Stanley J. Kurzeja, 12813 Middleton La., Fairfax, Va. 22033

[21] Appl. No.: 621,105

[22] Filed: Nov. 30, 1990

[51] Int. Cl.[5] ..... C06D 5/00

[52] U.S. Cl. ..... 102/530; 60/253; 102/374; 239/265.11; 244/3.22

[58] Field of Search ..... 60/253, 255; 239/265.11, 19, 397.5; 102/374, 530, 531; 244/3.22

[56] References Cited

U.S. PATENT DOCUMENTS

| | | | |
|---|---|---|---|
| 2,998,704 | 5/1961 | Brazil et al. | 60/255 |
| 3,001,498 | 9/1961 | Karp | 60/253 |
| 3,054,258 | 9/1962 | Marti, Jr. | 102/531 |
| 3,291,397 | 12/1966 | Johnson | 239/397.5 |
| 4,116,131 | 9/1978 | Shafer et al. | 60/255 |
| 4,137,289 | 1/1979 | Bornstein | 102/374 |
| 4,766,726 | 8/1988 | Tackett et al. | 60/255 |

*Primary Examiner*—Harold J. Tudor

[57] ABSTRACT

A gas generator for a missile includes a propellant grain, inhibitor, internal insulation, case forward and aft closures, external insulation, igniters and a gas outlet assembly. The general steps for manufacturing the gas generator are to fabricate the components and assemble the case including the external and internal insulation. The cylindrical inhibitor is then attached to the forward closure to form a cavity into which the propellant is cast forming a sleeve around it when assembled. This propellant grain assembly is then inserted into the case, and the forward closure, igniter and gas outlet assembly are then attached to the case to form a complete gas generator. When the gas generator is ignited, the propellant is consumed by burning the solid material into hot gases which escape through the gas outlet assembly. The propellant contains its own fuel and oxidizers to provide the necessary energy.

2 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

GAS GENERATION FOR A MISSILE POST-BOOST CONTROL SYSTEM

FIELD OF THE INVENTION

This invention relates to gas generators and more particularly, but without limitation thereto, to solid propellant gas generators for use in post-boost control systems of guided missiles.

BACKGROUND OF THE INVENTION

Because of increased performance requirements relating to missile systems and the gas generators used for propulsion energy requirements there is a continuing search for new techniques for generating large masses of gas at high pressure. These gas generators are used in missile post-boost control systems, for example, to provide gas energy to the control system thrust nozzles for forward, reverse, pitch, yaw and roll control. Prior techniques have not provided the high performance required for advanced weapon systems that must undergo severe operating environments and have requirements for longer periods of high pressure gases and at minimum weight. These and other requirements have been accomplished by the gas generator design of the present invention.

OBJECTIVES OF THE INVENTION

An object of the present invention is to provide a solid propellant gas generator to withstand the severe operating conditions of a missile system.

Still another object of the present invention is to provide the high energy gas requirements of missile systems.

A further object of the present invention is to provide an efficient, reliable and cost effective gas generator design for a missile system.

A still further object of the present invention is to provide a solid propellant gas generator that has high gas flow, high operating pressure, high operating temperatures, long burn time duration, and which operates efficiently, reliably and with optimum safety.

SUMMARY OF THE INVENTION

These objects of the invention and other objects, features and advantages to become apparent as the specification progresses are accomplished by the invention according to which, briefly stated, a gas generator includes a propellant grain, inhibitor, internal insulation, case forward and aft closures, external insulation, igniters and a gas outlet assembly. The general steps for manufacturing the gas generator are to fabricate the components and assemble the case including the external and internal insulation. The cylindrical inhibitor is then attached to the forward closure to form a cavity into which the propellant is cast forming a sleeve around it when assembled. This propellant grain assembly is then inserted into the face, and the forward closure, igniter and gas outlet assembly are then attached to the case to form a complete gas generator. When the gas generator is ignited, the propellant is consumed by burning the solid material into hot gases which escape through the gas outlet assembly. The propellant contains its own fuel and oxidizers to provide the necessary energy. As the propellant burns, the length and weight of the propellant grain, of course, decreases.

LIST OF ADVANTAGES OF THE INVENTION

An important advantage of the present invention is to provide a lightweight, high pressure, long duration, efficient gas generator that has a removable propellant grain assembly. Moreover, all of the adverse structural and thermal environments are resolved by the gas generator design of the present invention.

These and further objectives, constructional and operational characteristics, and advantages of the invention will no doubt be more evident to those skilled in the art from the detailed description given hereinafter with reference to the figures of the accompanying drawings which illustrate a preferred embodiment by way of non-limiting example.

GLOSSARY

The following is a glossary of elements and structural members as referenced and employed in the present invention.

| | |
|---|---|
| 11 | gas generator |
| 13 | propellant grain |
| 15 | inhibitor |
| 17 | internal insulation |
| 19 | case |
| 21 | external insulation |
| 23 | internal insulation |
| 25 | forward closure |
| 27 | external insulation |
| 29 | gas outlet assembly |
| 31 | igniter assembly |
| 33 | aft dome section |
| 34 | thickened forward section of case 19 |
| 35, 37, 39, 41 | attachment lugs |
| 43 | thickened section of forward enclosure 25 |
| 45 | o-ring groove |
| 47 | annular retaining key groove |
| 49 | handling holes |
| 51 | retaining key |
| 53 | o-ring |
| 55, 57, 59, 61, 63 | silica phenolic insulation section |
| 65, 67, 69, 71 | molybdenum liners |
| 73 | external outlet insulation |
| 75 | titanium elbow casting |
| 77 | columbium reducer |
| 83 | gas diffuser for igniter 31 |
| 85 | air gap |

DESCRIPTION OF THE PREFERRED EMBODIMENTS

Figure 1:
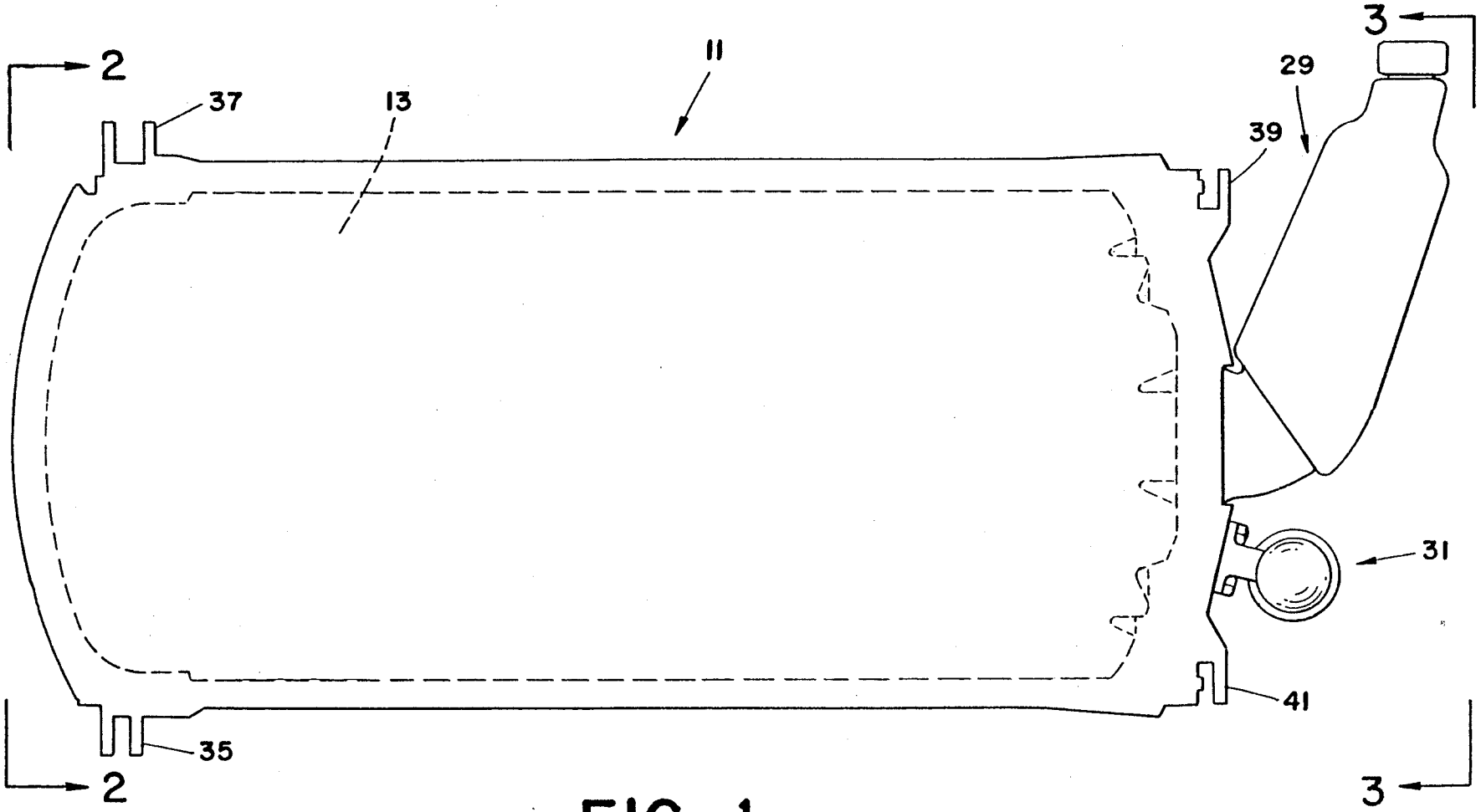
FIG. 1 is a side elevation of the gas generator assembly of the present invention.
Figure 2:
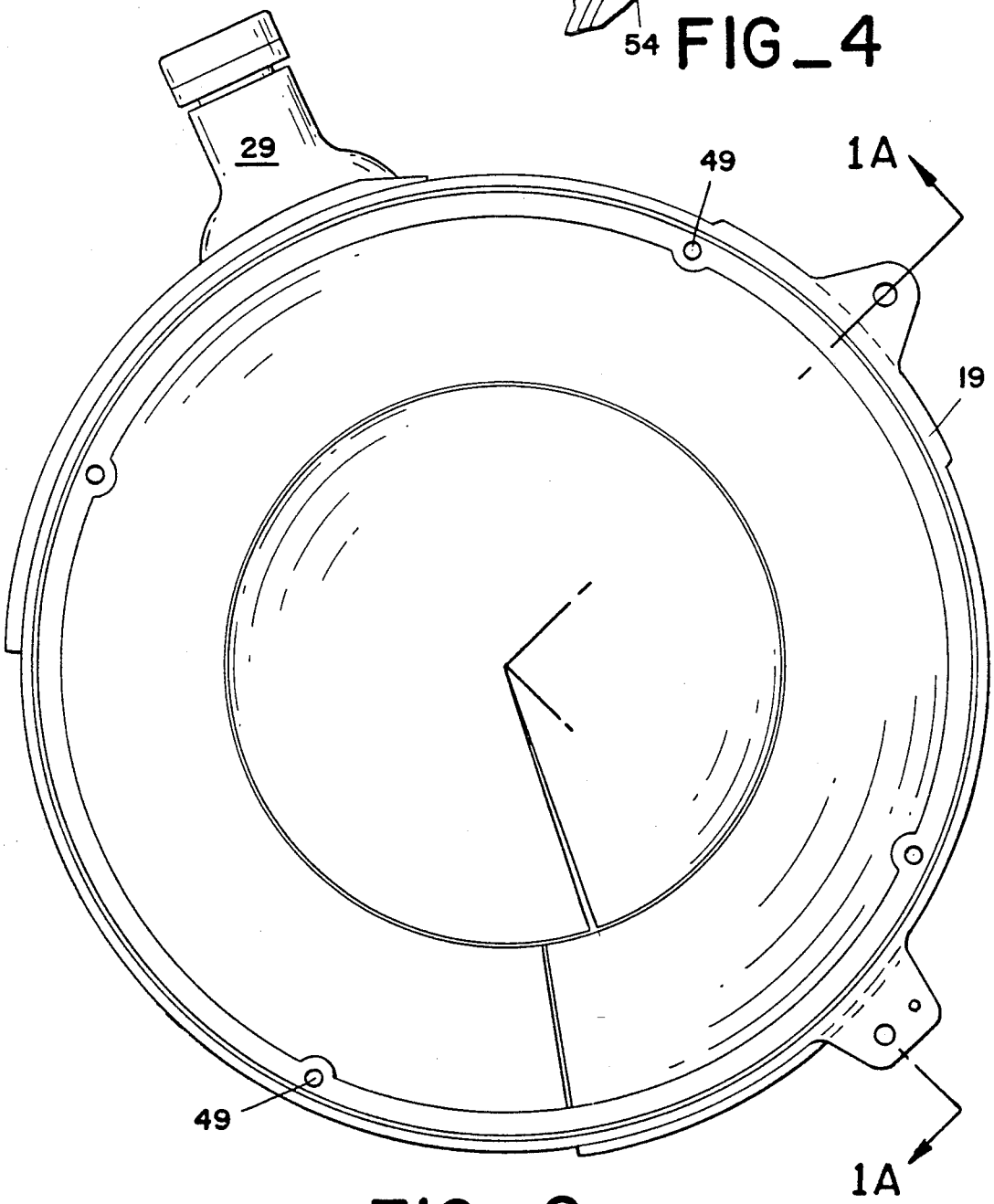
FIG. 2 is the forward view taken at view line 2—2 of FIG. 1.
Figure 3:
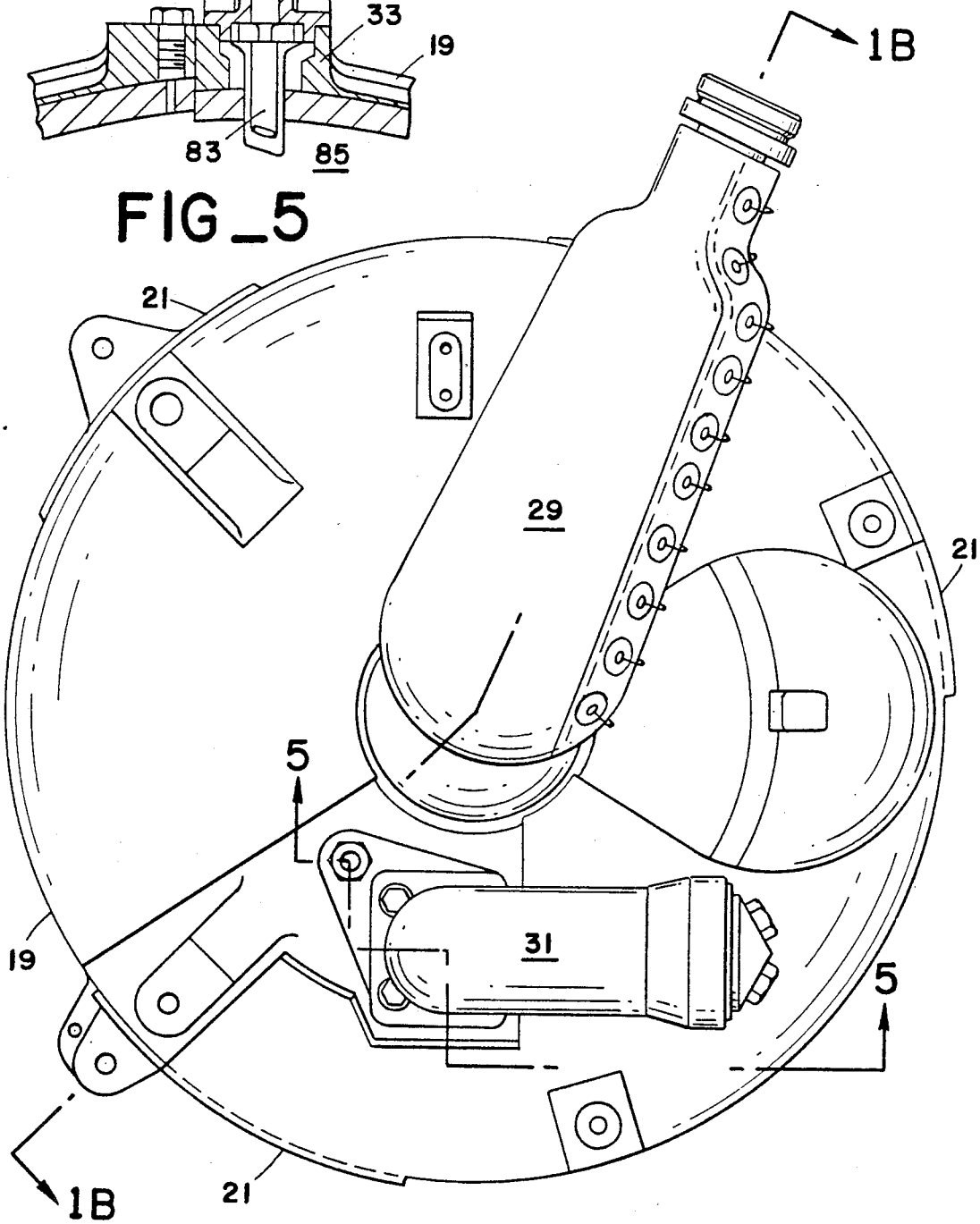
FIG. 3 is the aft view taken at view line 3—3 FIG. 1.

Referring now to the drawings wherein like reference numerals are used to designate like or corresponding parts throughout the various figures thereof, there is shown in FIG. 1 a side elevation view of the gas generator assembly of the present invention as indicated by reference numeral 11. FIG. 2 is the forward view as taken as 2—2 of FIG. 1 and FIG. 3 is the aft view taken at 3—3 of FIG. 1.

Figure 1A:
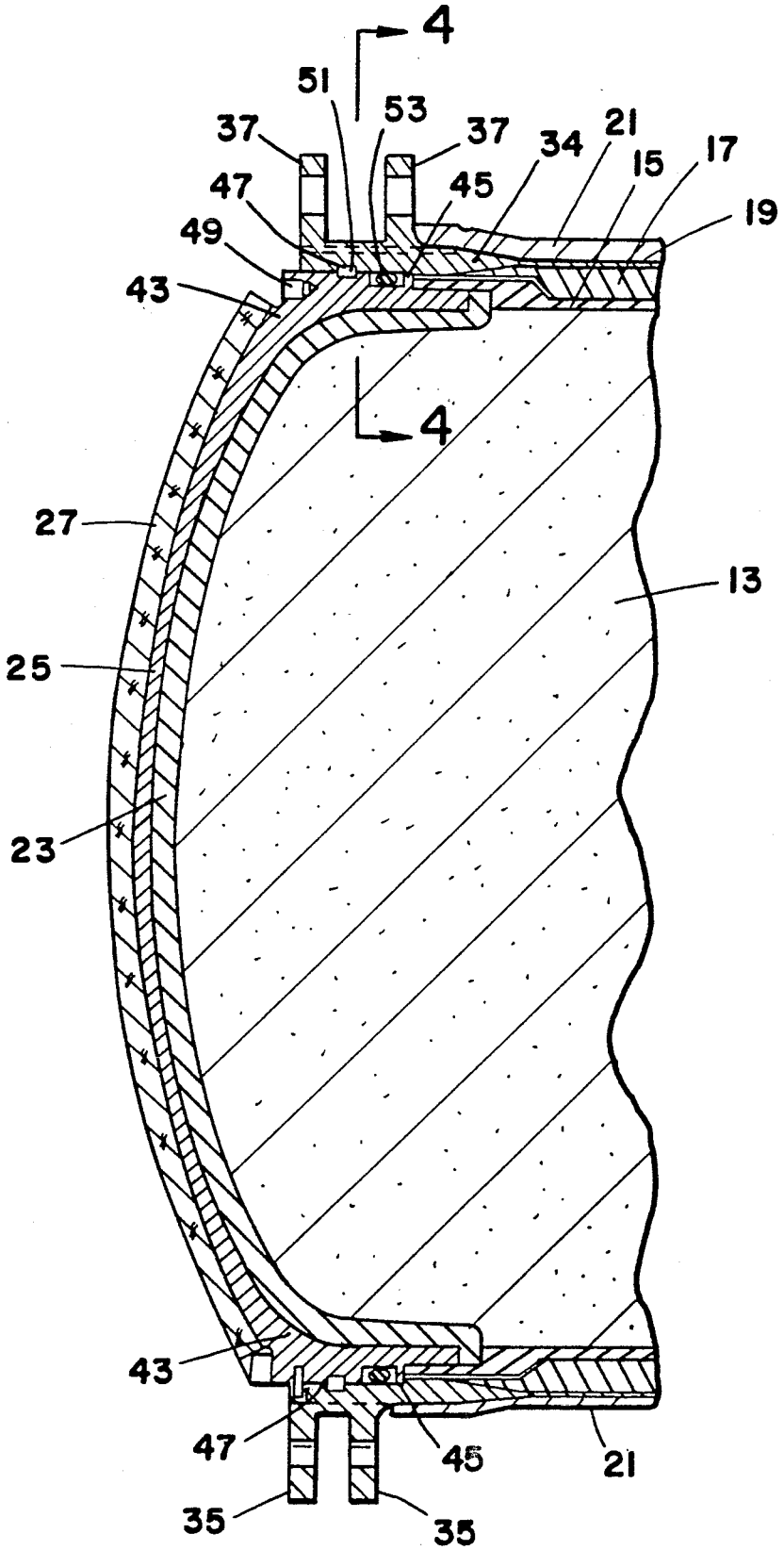
FIG. 1A is a cross-sectional view taken of the forward section along section line 1A—1A of FIG. 2.
Figure 1B:
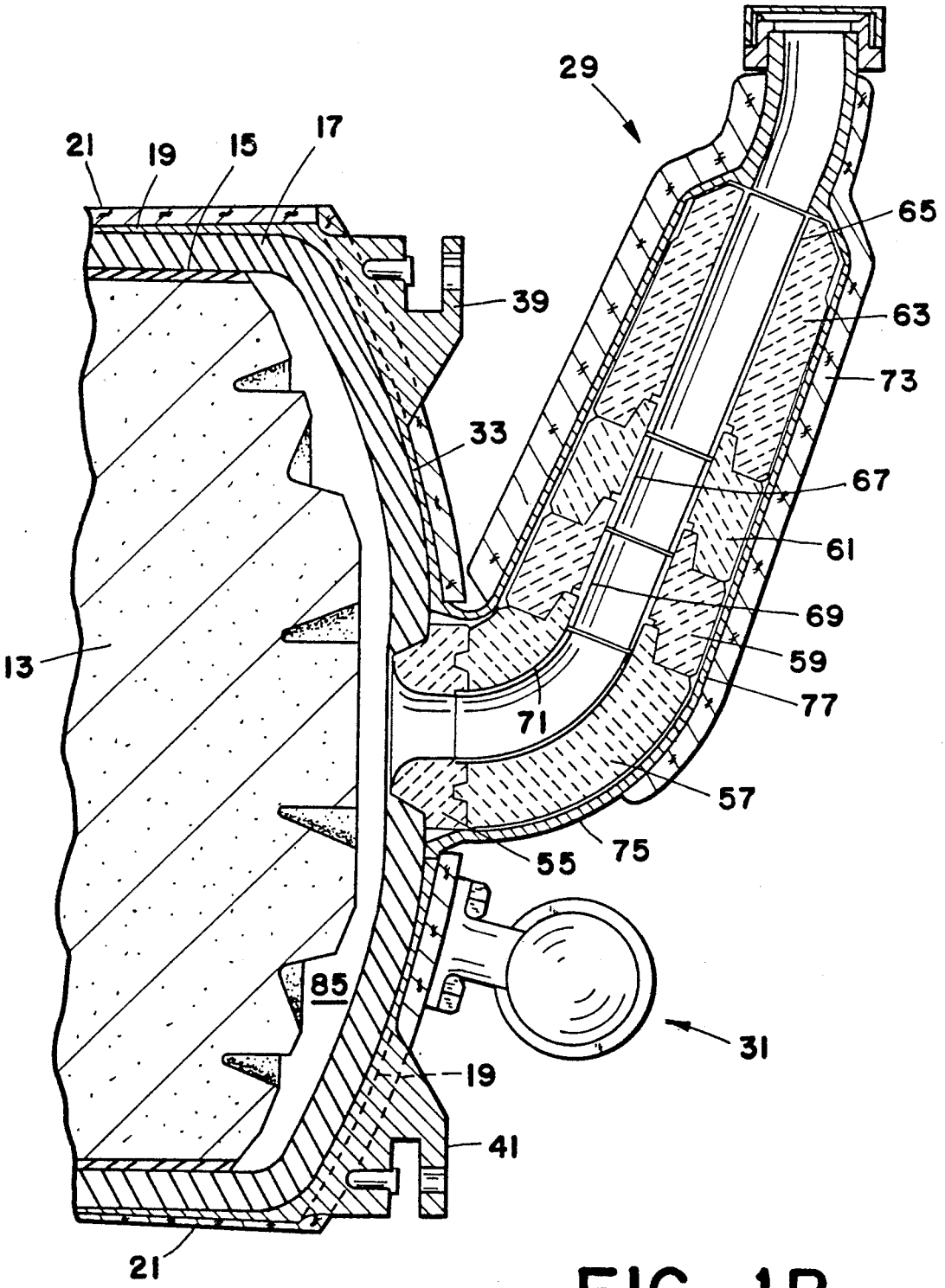
FIG. 1B is a cross-sectional view taken of the aft section along section line 1B—1B of FIG. 3.

Generator 11 includes propellant grain 13, inhibitor 15, internal insulation 17, case 19, all of which are cylindrical in configuration. The latter three are in a concentric sleeve arrangement with the external insulation 21. The forward insulation comprises three major segments. The forward section is domed shaped and includes internal insulation 23, forward closure 25, and external insulation 27. The aft section shown in FIGS. 1B and 3 is domed shaped and has gas outlet assembly 29 and igniter assembly 31 attached to the exterior thereof.

The propellant grain is made from a hydroxyl terminated polybutadriene polymer propellant with HMX solid particles used as oxidizer (HTPB/HMX) composite propellant with flame temperature of nearly 3,000° F. The propellant weight is approximately 232 pounds and is cast into a cylindrical inhibitor 15 to form a cylindrical propellant grain having a length of about 29 inches and a diameter of about 13 inches. The grain is an end burning design with a configured start up surface for added initial burn area and uniform flame front propagation.

Figure 4:
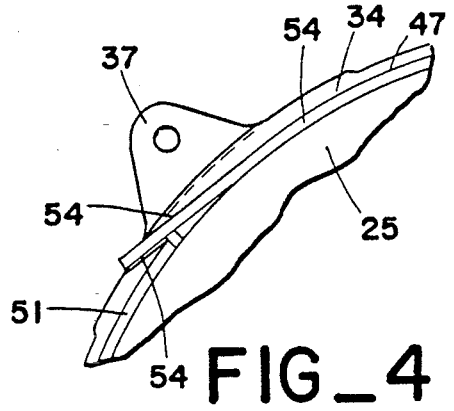
FIG. 4 is a cross-sectional view taken at section line 4—4 of FIG. 1A.

Case 19 is made from 6Al-4V titanium alloy and is of cylindrical configuration with an integral half dome section 33, an enlarged forward section 34 and attachment lugs 35, 37, 39, and 41. Forward closure 25 is made from 6Al-4V titanium alloy, has a domed configuration, thickened section 43, o-ring groove 45, retaining key groove 47 and four handling holes 49. The forward closure is removably attached to the case with a retaining key 51 and is sealed by means of a o-ring 53. FIG. 4 shows the forward retention assembly including an opening 54 formed in attachment lug 37 wherein a flexible retaining key 51 is inserted therethrough and into annular retaining groove 47 to lock forward titanium closure 25 to the forward section 34 of titanium case 19. See FIG. 1A.

The radial interface between the exterior surface of the inhibitor 15 and the interior surface of the insulator 17 is an interference fit having no clearance. This is done to maximize propellant weight, assure mechanical integrity, and eliminate separation of the inhibitor and the propellant grain during gas generator operation. Elimination of this separation is critical to prevent propellant burn-back in the interference region between the grain surface and the inhibitor. The propellant grain assembly is loaded and unloaded by cooling the grain assembly to provide necessary clearance between the inhibitor and insulator and then subjecting the assembly to normal temperature conditions where the interface achieves an interference fit.

As shown in FIG. 1B, gas outlet assembly 29 includes internal silica phenolic insulation sections 55, 57, 59, 61 and 63, molybdenum liners 65, 67, 69, and 71, external outlet insulation 73, titanium elbow casting 75 and columbium reducer 77. This particular design allows assembly of thick insulation sections 55–63 which permits a long burn time of hot high pressure gases.

Figure 5:
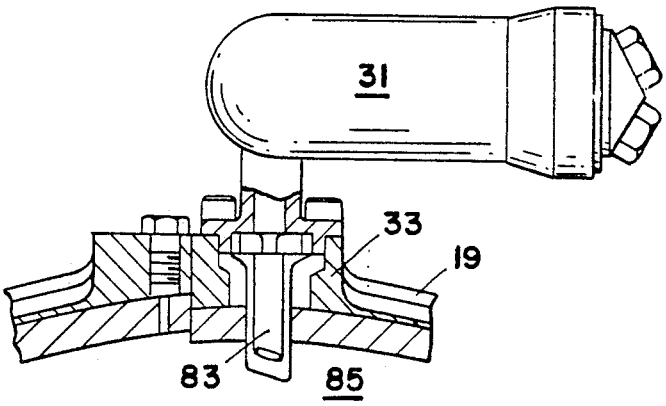
FIG. 5 is a partial cross sectional view taken along section line 5—5 of FIG. 3.

FIG. 5 shows igniter assembly 31 which is attached to the aft dome section 33 of the case. The igniter assembly contains a propellant which generates hot gases that are emitted through gas diffuser 83 that extends into air gap 85 between the aft end of the propellant and the insulator 17. These hot gases ignite the propellant which discharges its gases through gas outlet assembly 29.

The constituents and process of the propellant to inhibitor bonding system of the present invention are as follows:

(1) The above described inhibitor and forward closure assembly (which contains insulation 23) are assembled and placed into casting tooling. The inhibitor 15 and interior insulation 23 are made of the same material and generally comprise an ethylene propylene, diene monomer (EPDM/neoprene rubber binders containing silica powder and aramid fibers.) The specific chemical composition is set forth in Tables I and II as follows:

TABLE I (Chemical Composition)

| Function | Ingredient | By Weight Composition in Parts per 100 Parts of Rubber Binder (PHR) Minimum | Maximum | Nominal |
|---|---|---|---|---|
| Binder | EPDM Elastomer | 79.0 | 81.0 | 80.0 |
| | 2 Chlorobutadiene 1,3 Elastomer | 19.0 | 21.0 | 20.0 |
| Filler | Silica Hydrate | 29.0 | 31.0 | 30.0 |
| Antioxidants | Polymerized Trimethyl Dihydroquinoline | 1.9 | 2.1 | 2.0 |
| | Alkylated Diphenylamines and Diphenyl-P-Phenylendiamene | 0.9 | 1.1 | 1.0 |
| Curing Agent | 40% a,a' Bis (Tert-Butylperoxy) Diisopropylbenzene | 5.5 | 5.7 | 5.6 |
| Processing Aids | Napthenic Process Oil | 4.9 | 5.1 | 5.0 |
| | Synthetic Polyterpene Resin | 4.9 | 5.1 | 5.0 |
| Fiber | Aramid Fiber (.25 inch) | 27.0 | 29.0 | 28.0 |
| Activator | Zinc Oxide, Technical | 4.9 | 5.1 | 5.0 |

TABLE II (Functional Description of Ingredients)

| Ingredient | Description |
|---|---|
| EPDM Elastomer | EPDM elastomer; binder also adds chemical bond sites |
| 2 Chlorobutadiene 1,3 Elastomer | Choroprene elastomer added to improve processing and bonding |
| Silica Hydrate | Mineral filler to improve thermal properties (mixing and packing) |

TABLE II-continued

| (Functional Description of Ingredients) | |
|---|---|
| Ingredient | Description |
| Polymerized Trimethylquinoline | Polymerized trimethylquinoline antioxidant prevents aging degradation of the polymer chain |
| Alkylated Diphenylamines and Diphenyl-p-Phenylendiamine | Diphenylamine: antioxidant used in combination with above for high temperature storage conditions |
| 40% a,a' Bis (Tert-Butylperoxy), Diisopropylbenzene (curative) | 40% active peroxide supported on Burgess KE clay; curative for both polymers also provides aging stability as compared to Sulfur, for example. |
| Napthenic Process Oil | Lubricating oil; improve mixing |
| Synthetic Polyterpene Resin | Tackifier added to improve green tack (adhesion between uncured layers) |
| Aramid Fiber (.25 inch) | Aramid fiber reinforcement; improved char retention and thermal properties |
| Zinc Oxide | Activator for curing agent |

The following are the process steps used to prepare the uncured thermal insulation and inhibitor composition.

(1) The initial batch includes mixing the binders, antioxidants, processing aids and catalyst. A Banbury mixer is used for approximately 8 to 10 minutes (10 minutes optimum).

(a) The fiber filler is then mixed with the step (1) constituents. A Banbury mixer is used for three submixes each for approximately one minute.

(b) The curative is then mixed with the step (a) constituents. A Banbury mixer is used for approximately one minute to form a slab about 4 inches thick, one foot wide and from one to two feet long.

(c) The mixed slab of step (b) is then calendered to about 0.1 inch thick.

(d) The calendered material of step (c) is then remixed in a Banbury mixer for about one minute to form a mixed slabs as defined in step (b).

(e) The mixed slab of step (d) is then calendered to about an 0.1 inch thick sleet having an approximate 4 foot width.

(f) A thin plastic cover sheet is applied to one surface of the step (6) uncured insulation sheet and rolled for subsequent use.

(g) When used; the uncured insulation is cut to proper configuration; the configured insulation is laid up and the plastic sheet is removed. If additional insulation thickness is required another piece of uncured insulation is cut to proper configuration and laid up against the first uncured insulation sheet and the plastic sheet is removed. The first and second sheets are tacky and are pressed together to form contiguous insulation sheets. The process is repeated until the total desired uncured insulation thickness is achieved.

(h) The uncured insulation of step (g) is then cured by subjecting it to elevated temperatures wherein the time and temperature is dependent upon the total thickness of uncured insulation. The inhibitor sleeve has a nominal thickness of about 150 mils, a length of about 30 inches and a diameter of about 13 inches.

(2) The inner surface of the cavity formed by inhibitor sleeve 15 and insulator 23 is cleaned with a methyl ethyl ketone (MEK) dampened lint free cloth and is then dried for at least 60 minutes.

(3) A barrier coat is then brush applied to the interior surface of the cleaned cavity. The barrier coat is an epoxy resin with amine curing agent, such as Scotchcast-8 TM (made by The Minnesota Mining and Manufacturing Co.). The barrier coat is brush applied to a nominal weight of about 0.35 pounds or about 3–4 mils thickness.

(4) The barrier coat is then cured wherein the cure time and temperature is 24 hours minimum at 60° to 90° F. plus 1 hour minimum at 170°±5° F.

(5) A liner is then brush coated onto the cured interior surface of the barrier coat. The inhibitor sleeve and forward closure are preheated to 170° F. for 2 to 6 hours prior to liner application. The liner is applied in two brush coats and has a final nominal weight of about 0.25 pounds or 2–3 mils. thickness. The chemical composition of the liner is carbon black, isophorone diisocyanate liquid, polybutadiene liquid hydroxyl terminated (type II), and ferric acetylacetonate. The mixing process of the uncured liner material is as follows:

(a) Add polybutadiene liquid hydroxyl terminated (type II) and ferric acetylacetonate to mixer and blend 1 hour minimum at low speed with mix temperature 160°±10° F. Cool to 90°±10° F. before further processing.

(b) Add isophorone diisocyanate and blend 10 minutes minimum at low speed.

(c) Screen carbon black through a 100 mesh screen using Ro-Tap with approximately 5 mm diameter glass beads. Add approximately ⅓ of the carbon black to mix and blend for 10 minutes minimum at low mixer speed. Repeat mixing step for each of the two remaining portions of carbon black.

(d) When all ingredients have been added and mixed, run mixer at low speed for 60 minutes minimum under vacuum of 25 inches of mercury minimum. Mix temperature shall not exceed 90° F. Break vacuum with nitrogen or argon.

(e) Clean storage cans and lids with solvent and allow to air dry. Transfer mix to 1 quart cans, or 1 pint cans. Purge cans with nitrogen or argon before filling. After filling, flush with nitrogen or argon before installing lids.

(f) Store in deep freeze at 0°±10° F.

(6) The liner is then cured for a total time of 72 to 96 hours at a temperature of 170° F.±5° F. If propellant casting operations are not to begin immediately purge with nitrogen and seal. The lined assembly may be stored up to 2 weeks maximum before casting at 60° to 90° F.

(7) The propellant is manufactured and then cast into the lined cavity. The propellant materials are HMX Class I, carbon black, isophorone diisocyanate, and polybutadiene liquid hydroxyl terminated (type II).

(a) The mixing process of the uncured propellant begins by adding the polybutadiene liquid hydroxyl terminated (type II) and the carbon black to mixer. The carbon black shall be added within 4 hours maximum of removal from "in use" storage. Blend the ingredients for 5 minutes at atmospheric pressure and then under vacuum for 15 minutes at a minimum vacuum of 28 inches of mercury. The vacuum shall be broken with nitrogen. While mixing, add ground Class 1 HMX utilizing a vibrating feeder. This mixing shall be for a minimum of 40 minutes at atmospheric pressure. While mixing, add the unground Class 1 HMX utilizing a vibrating feeder. This mixing shall be for a minimum of 45 minutes at atmospheric pressure followed by blending for a minimum of 1 hour at a minimum vacuum of 28 inches mercury. Vacuum shall be broken with nitrogen.

(b) Removed sample for moisture analysis and total solids test.

(c) Add IPDI, mix 10 to 12 minutes, at atmospheric pressure. Blend under vacuum at a minimum vacuum of 28 inches of mercury for 90 minutes. During the final mixing, the mixer shall be run at its slowest speed and the water jacket temperature adjusted to yield a final mix temperature of 140°±5° F. Break vacuum with nitrogen. The propellant shall be cast within 10 hours maximum upon completion of mixing.

(d) The casting process of the uncured propellant begins by preheating the casting hardware assembly 2 to 6 hours at 170°±100° F. prior to casting if not already hot from the liner cure.

(e) The hopper is loaded with propellant and replenished as necessary during casting. The hopper water jacket temperature is maintained at 140°±10° F. and relative humidity is maintained at 30 to 60% during casting.

(f) The inhibitor sleeve/closure assembly is evacuated to a pressure of not less than 5 mm of mercury. Close off vacuum line to inside of inhibitor sleeve, but maintain vacuum on outside of inhibitor sleeve to prevent sleeve from collapsing during casting. Open hopper valve to allow propellant to flow into inhibitor sleeve, allowing pressure in the sleeve to be not more than 20 mm of mercury until the propellant level is approximately 1 inch from bottom of casting tooling "clamp" ring, discontinue breaking vacuum and add propellant to obtain correct height of maximum of 2 inches from bottom of "clamp" ring. Close hopper valve and break vacuum. Remove casting hopper and measure propellant level. If insufficient propellant, replace casting hopper, evacuate the sleeve to a pressure of not more than 120 mm of mercury and cast additional propellant. Release vacuum on inside of sleeve first, then release vacuum on outside of sleeve.

(g) The propellant is then cured, thereby bonding the propellant to liner inhibitor 15, by sealing the end of the casting cylinder and applying nitrogen gas at a pressure of 40±5 psig for the first 60 hours minimum of cure. The propellant shall be cured for a total time of 140 to 164 hours at 170° F.±5° F. Total deviations from propellant cure temperature totaling one hour are permitted provided that the excursion temperatures are greater then 40° F. and less than 200° F. Total deviations in excess of one hour and less than 12 hours are permitted provided the excursion temperatures are less than 130° F. and greater than 90° F. The total propellant cure time is to be extended by the total time of propellant cure temperature excursion below 165° F.

(h) The nitrogen gas is released and the grain assembly allowed to cool 1 hour minimum after cure.

After the above described manufacturing and curing process the assembly is then machined as previously described and as shown in the FIG. 4.

Because of the severe temperature, time, pressure and load conditions put on a gas generator of the type described it is critical that the metal case to non-metal bonding system be effective under adverse conditions. The present invention provides such a bonding system the details of which are as follows:

(1) The titanium case (6AL-4V) is sandblasted with a 180 grit aluminum oxide abrasive to a surface roughness not to exceed 125 microinches.

(2) The interior sandblasted surface is then cleaned by using a lint free cloth dampened in methyl ethyl ketone (MEK) solvent.

(3) A corrosion resistant coating is then applied such as Chemlok 205 TM (rubber to metal adhesive primer made by Lord Chemical Products) by brush application and having a nominal thickness of 1–2 mils. Chemlok 205 TM, for example, is a chlorinated resin and phenolic blend in 79% solvent with 5% titanium oxide and 1% zinc oxide.

(4) The corrosion resistant coating is then air dried at ambient temperature and atmosphere for at least 60 minutes.

(5) A metal to rubber adhesive coating is then applied using an adhesive such as Chemlok 252 TM by brush application and leaving a nominal thickness of 1–2 mils. Chemlok 252 TM, for example, is a chlorinated resin with EPDM rubber curing agent.

(6) The Chemlok 252 TM adhesive coating is then air dried at ambient temperature and atmosphere for at least 60 minutes.

(7) Uncured insulation material is then laid up against the interior surface of the air dried adhesive coating. Several layers are used until the desired insulation characteristics (defined by thickness or weight) are achieved. Each layer adheres to the next since the uncured material is tacky. Between each layer a vacuum bag is inserted and a vacuum is pulled between the bag and the insulation material to attach adjacent layers of material. The insulation material preferable has plastic backing for storage and handling purposes.

A specific example of the lay-up process for the sheets of uncured insulation is as follows:

1. For the metal aft dome insulation cut five patterns, four patterns of approximately 0.100 inch thick and 1 additional pattern (thickness as required of insulating material). Pattern sizes are nominal in inches as follows:

TABLE III

| Pattern | OD (in.) | ID (in.) | Thickness (in.) |
|---|---|---|---|
| 1 | 14.60 | 2.670 | .100 |
| 2 | 14.60 | 2.425 | .100 |
| 3 | 14.70 | 2.290 | .100 |
| 4 | 14.75 | 2.155 | .100 |
| 5 | 14.80 | 2.030 | As required |

2. For the metal case insulation cut five patterns of approximately 0.100 inch thick insulating material. Pattern sizes are nominal in inches as follows:

TABLE IV

| Pattern | Width (in.) | Length (in.) Bottom | Top |
|---|---|---|---|
| 1 | 26 13/16 | 45¼ | 45½ |
| 2 | 26 | 45 | 44 11/16 |
| 4 | 25½ | 43¼ | 43¾ |
| 5 | 6½ | 42¼ | 42½ |

The grain direction of the insulation material shall run axially with the motor case.

3. Lay dome patterns on table and clean top side with MEK and allow to air dry 10 minutes minimum.

4. Place patterns 1 and 2 clean sides mating into a dome preform fixture. Leave plastic backing on the outsides.

5. Place patterns 3 and 4 in similar condition. Remove plastic backing from outside of pattern 4 and clean with MEK. Allow to air dry 10 minutes minimum. Place pattern 5, clean, unprotected side on pattern 4. Leave plastic backing on outsides of patterns 3 and 5. Place patterns into a dome preform fixture.

6. Place mold assembly into a press and pressurize to 5–8 tons for 5–8 minutes minimum. Allow insulating material to stay in mold until needed.

7. Remove dome insulation from fixture. Remove the plastic backing and clean with MEK. Allow to air dry 10 minutes minimum.

8. Place pattern into the case first, locating the edge the distance from case retaining key groove. Smooth the pattern against the inside of case. Wipe the pattern surface with MEK and allow to air dry 10 minutes minimum. Filter circulating air is to be used for approximately 2 minutes.

9. Install conventional cure ring in case. Install an oven film bag and fasten to cure ring with vacuum sealer or equivalent. Attach vacuum lines to fittings on cure ring and elbow connector and pull vacuum (24 inch Hg) for 10 minutes minimum.

10. Remove cure ring, oven film bag and vacuum lines. Cure ring may be left in place.

11. Install two ply dome insulation piece into case. Align insulation hole with entrance to outlet.

12. Pull vacuum per Steps 9 and 10.

13. Install remaining dome insulation piece into case per steps 11 and 12.

14. Install remaining patterns individually per steps 9 and 10.

15. Using new O-rings, install case cure ring into end of case and install conventional retaining key cure plug. Place teflon glass fabric on dome and side wall full length. Install cure bag into gas generator case. Secure cure bag to cure ring with rubber strip and hose clamp. Remove gas generator case assembly from handling fixture and place on cart and secure. Install ortman key plug and apply vacuum sealer or equivalent to all sealing areas of case.

16. Pull vacuum of 24 inches Hg for 30 minutes minimum. Ensure that cure bag has all the wrinkles out, is seated correctly and there are no leaks. This step may be performed after installation into an autoclave but prior to the start of the heating of the autoclave.

17. Move case to the autoclave. Place gas generator case on cure cart and install in autoclave.

18. The insulation, adhesive and casing are now cured which results in a bonding between the case and insulation. A specific example of the autoclave curing process is as follows:

(a) Attach vacuum line from pump to vacuum fitting on case outlet.

(b) With assembly under a vacuum of 24 inches of mercury minimum, start heating autoclave to 160° F.±10° F. and maintain for 2.0–3.0 hours at temperature.

(c) Start air compressor and pressurize assembly to 125–145 psig and increase the temperature to 195° F.±10° F. Maintain temperature and pressure for 1.5–2.0 hours.

(d) Increase autoclave temperature to 325° F.±10° F. and maintain for 3.5–4.0 hours. NOTE: Any deviation from the required temperature tolerance of 10° F. or less for a total of 15 minutes or less will be acceptable as long as the actual cure time to the required temperature is within the required cure time tolerance except when the temperature deviates above the temperature requirement.

(e) Maintain 125–145 psig until autoclave temperature reaches 150° F. This cool down period shall not be less than 30 minutes.

(f) Release pressure, remove assembly from autoclave and allow to cool to ambient.

(g) Remove all fittings, cure bag, and glass fabric from gas generator case. Clean case as necessary using MEK.

19. After the completion of step 18 the interior surface is machined to final dimensions for receiving the propellant grain assembly.

This invention has been described in detail with particular reference to a certain preferred embodiment, but it will be understood that variations and modifications can be effected within the spirit and scope of the invention. This invention is not limited to the preferred embodiment and alternatives heretofore described, to which variations and improvements may be made, without departing from the scope of protection of the present patent and true spirit of the invention, the characteristics of which are summarized in the following claims.

What is claimed is:

1. A gas generator comprising:

a cylindrical chamber, said chamber having a domed forward section, a domed aft section, said aft section having a centrally located aft round oriface;

a cylindrical propellant grain having one end abutting said forward section and the opposite end spaced from said aft section;

an outlet assembly connected to said aft section and communicating with said aft opening; and said cylindrical chamber including a cylindrical case, said aft section being integral with said case, said case and aft section being formed of titanium.

2. The gas generator of claim 1 wherein said outlet assembly includes a plurality of thick insulation sections that are inserted into the outlet assembly to permit long burn time of hot, high pressure gases.

* * * * *